(12) United States Patent
Del Gaizo et al.

(10) Patent No.: US 9,994,100 B1
(45) Date of Patent: Jun. 12, 2018

(54) SHUTTER CONTROL ARRANGEMENT FOR A VEHICLE

(71) Applicant: GM Global Technology Operations LLC, Detroit, MI (US)

(72) Inventors: Steven A. Del Gaizo, Madison Heights, MI (US); William Fang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/796,033

(22) Filed: Oct. 27, 2017

(51) Int. Cl.
*B60K 11/04* (2006.01)

(52) U.S. Cl.
CPC .................... *B60K 11/04* (2013.01)

(58) Field of Classification Search
CPC ...... B60K 11/083; B60K 11/04; B60W 30/02; H02N 1/04; B62D 35/00
See application file for complete search history.

(56) References Cited

U.S. PATENT DOCUMENTS

| | | | | |
|---|---|---|---|---|
| 3,954,230 A | * | 5/1976 | Machuta | B64C 3/48 244/12.5 |
| 4,235,397 A | * | 11/1980 | Compton | B64C 3/48 244/12.5 |
| 2011/0135477 A1 | * | 6/2011 | Mohammed | F03D 7/0236 416/91 |
| 2014/0039765 A1 | * | 2/2014 | Charnesky | F01P 7/10 701/49 |

* cited by examiner

Primary Examiner — John D Walters
Assistant Examiner — James J Triggs
(74) Attorney, Agent, or Firm — Quinn IP Law

(57) ABSTRACT

A vehicle includes a shutter system cooperating with at least one grille opening in the body of a vehicle. The shutter system includes a shutter assembly to regulate airflow entering through the at least one grille opening. The shutter assembly includes a frame and at least one vane operably connected to the frame and selectively positionable between at least an open position and a closed position. The at least one vane includes a body shaped as a cambered airfoil defining a leading edge and an opposing trailing edge. The at least one vane is pivotally connected at a pivot point and is adjustable relative to the frame between at least the open position and the closed position in response to an airflow entering through the at least one grille opening interacting with the leading edge of the body of the at least one vane.

20 Claims, 2 Drawing Sheets

SHUTTER CONTROL ARRANGEMENT FOR A VEHICLE

INTRODUCTION

The present disclosure relates to a shutter control arrangement for a vehicle.

Vehicles frequently employ ambient airflow for cooling powertrain components situated in an under-hood compartment. Ambient airflow typically enters the under-hood compartment through a grille opening strategically positioned in a high pressure area on the vehicle body. A baseline or minimum airflow admitted into the vehicle's under-hood compartment through the grille opening is generally determined in response to the minimum cooling requirements of the subject powertrain. In turn, the minimum cooling required by a specific powertrain is typically influenced by such factors as the aerodynamics, mass, intended use, and actual duty cycle of the subject vehicle, as well as the power output of the vehicle's engine.

SUMMARY

A vehicle includes a shutter system cooperating with at least one grille opening in a body of a vehicle. The shutter system includes a shutter assembly regulating airflow entering through the at least one grille opening. The shutter assembly includes a frame and at least one vane operably connected to the frame and selectively positionable between at least an open position and a closed position. The at least one vane includes a body shaped as a cambered airfoil defining a leading edge and an opposing trailing edge. The at least one vane is pivotally connected to the frame about a pivot point and is adjustable relative to the frame between at least the open position and the closed position in response to airflow entering through the at least one grille opening interacting with the leading edge of the body of the at least one vane.

The leading edge of the cambered airfoil body of the at least one vane is defined as an area that yields a maximum curvature of the body and the trailing edge is defined as an area that yields a minimum curvature of the body. The cambered airfoil body of the at least one vane includes an upper camber and a lower camber. The cambered airfoil body is a positive camber as defined by the curvature of the upper camber being greater than the curvature of the lower camber. The pivot point of the at least one vane is adjustable between at least a first adjusted pivot point to configure the at least one vane to move to the open position and a second adjusted pivot point to configure the at least one vane to move to the closed position.

The shutter system may include a mechanism operatively connected to the at least one vane to actuate the at least one vane relative to each other and a controller regulating the mechanism, wherein the controller regulates the mechanism to control airflow through the at least one grille opening. The vehicle includes an internal combustion engine. The controller regulates the mechanism according to a load on the internal combustion engine. The engine is cooled by a fluid circulated through a heat exchanger. The vehicle includes a sensor adapted to sense a temperature of the fluid to communicate the temperature to the controller. The controller regulates the mechanism to cool the fluid circulated through the heat exchanger according to the sensed temperature of the fluid.

In another embodiment, a vehicle having a body includes at least one grille opening formed in the body of the vehicle and an internal combustion engine and a heat exchanger in fluid communication with the engine disposed proximate the at least one grille opening. The engine is cooled by a liquid circulated through the heat exchanger.

The shutter system includes a shutter assembly regulating airflow entering through the at least one grille opening. The shutter assembly includes a frame and at least one vane operably connected to the frame and selectively positionable between at least an open position and a closed position. The at least one vane includes a body shaped as a cambered airfoil defining a leading edge and an opposing trailing edge. The at least one vane is pivotally connected to the frame about a pivot point and is adjustable relative to the frame between at least the open position and the closed position in response to airflow entering through the at least one grille opening interacting with the leading edge of the body of the at least one vane.

The leading edge of the cambered airfoil body of the at least one vane is defined as an area that yields a maximum curvature of the body and the trailing edge is defined as an area that yields a minimum curvature of the body. The cambered airfoil body of the at least one vane includes an upper camber and a lower camber. The pivot point of the at least one vane is adjustable between at least a first adjusted pivot point to configure the at least one vane to move to the open position and a second adjusted pivot point to configure the at least one vane to move to the closed position.

The shutter system may include a mechanism operatively connected to the at least one vane and actuating the vanes relative to each other and a controller regulating the mechanism, wherein the controller regulates the mechanism to control airflow through the at least one grille opening. The controller regulates the mechanism according to a load on the internal combustion engine. The vehicle includes a sensor adapted to sense a temperature of the fluid and to communicate the temperature to the controller. The controller regulates the mechanism to cool the fluid circulated through the heat exchanger according to the sensed temperature of the fluid.

In yet another embodiment, a vehicle includes a vehicle body having a first end facing oncoming airflow when the vehicle is in motion relative to a road surface, an opposing second end and an under-hood compartment provided in the first end of the vehicle body. An internal combustion engine is received in the under-hood compartment and a heat exchanger in fluid communication with the engine, wherein the engine is cooled by a liquid circulated through the heat exchanger. At least one grille opening is provided in the first end of the vehicle body and cooperating with the under-hood compartment to receive the airflow.

The shutter system may include a mechanism operatively connected to the at least one vane and actuate the vanes relative to each other and a controller to regulate the mechanism, wherein the controller regulates the mechanism to control airflow through the at least one grille opening. The vehicle includes an internal combustion engine. The controller regulates the mechanism according to a load on the internal combustion engine. The engine is cooled by a fluid circulated through a heat exchanger. The vehicle includes a sensor adapted to sense a temperature of the fluid and to communicate the temperature to the controller. The controller regulates the mechanism to cool the fluid circulated through the heat exchanger according to the sensed temperature of the fluid.

The leading edge of the cambered airfoil body of the at least one vane is defined as an area that yields a maximum curvature of the body and the trailing edge is defined as an area that yields a minimum curvature of the body. The cambered airfoil body of the at least one vane includes an upper camber and a lower camber. The pivot point of the at least one vane is adjustable between at least a first adjusted pivot point to configure the at least one vane to move to the open position and a second adjusted pivot point to configure the at least one vane to move to the closed position.

The shutter system may include a mechanism operatively connected to the at least one vane and to actuate the at least one vane relative to each other and a controller regulating the mechanism, wherein the controller regulates the mechanism to control airflow through the at least one grille opening. The controller regulates the mechanism according to a load on the internal combustion engine.

The above features and advantages and other features and advantages of the present disclosure are readily apparent from the following detailed description of the best modes for carrying out the disclosure when taken in connection with the accompanying drawings.

DETAILED DESCRIPTION

Figure 1:
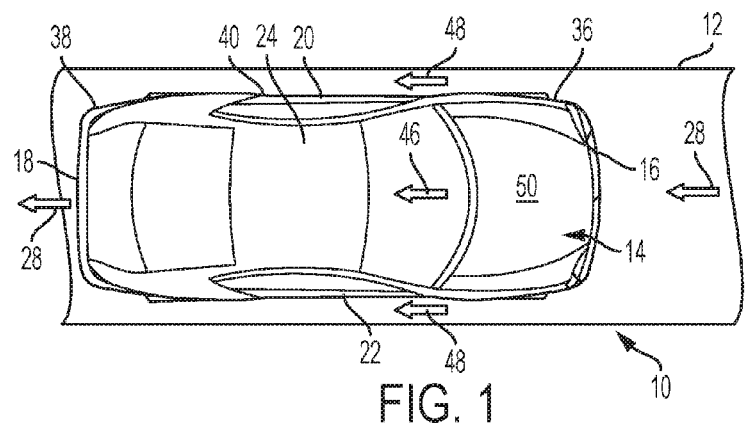
FIG. 1 is a top view of a vehicle having an airfoil arrangement in accordance with the present disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Referring to the drawings, wherein like reference numbers correspond to like or similar components throughout the several Figures, an example vehicle 10 is shown schematically in FIG. 1. The vehicle 10 may include, but not be limited to, a commercial vehicle, industrial vehicle, passenger vehicle, aircraft, watercraft, train or mobile platform. It is also contemplated that the vehicle may be a mobile platform, such as an airplane, all-terrain vehicle (ATV), boat, personal movement apparatus, robot and the like to accomplish the purposes of this disclosure.

Figure 2:
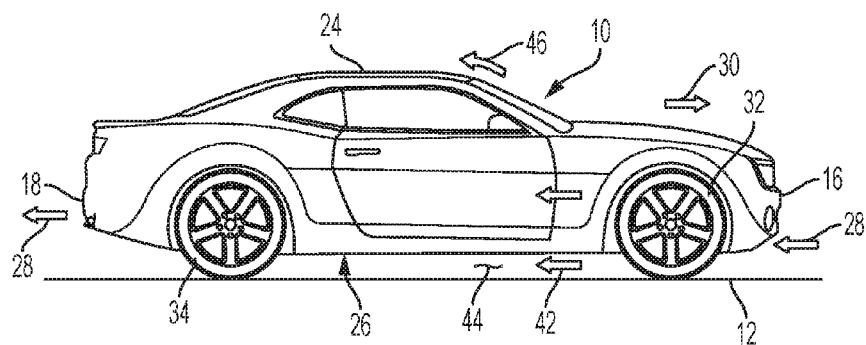
FIG. 2 is a side view of the vehicle shown in FIG. 1.

The vehicle 10 in FIG. 1 is positioned relative to a road surface 12. The vehicle 10 includes a vehicle body 14. The vehicle body 14 illustrated in the Figures defines six body sides. The six body sides include a first end or front end 16, an opposing second end or rear end 18, a first lateral portion or left side 20 generally extending between the first and second ends 16, 18, and an opposing second lateral portion or right side 22. The vehicle body 14 further includes a top body portion 24, which may include at least a vehicle roof portion, and an opposing lower body portion or underbody 26 as shown in FIG. 2. As understood by those skilled in the art, the first or front end 16 may face oncoming ambient airflow 28 when the vehicle 10 is in motion in a direction 30 relative to the road surface 12.

The vehicle 10 includes a frame cooperating with and supporting the vehicle body 14. The frame supports a first set of one or more wheels 32 disposed adjacent the first or front end 16 of the vehicle 10 and a second set of one or more wheels 34 disposed adjacent the second or rear end 18 of the vehicle 10. As shown in FIG. 1, the first set 32 of one or more wheels includes a pair of front wheels that are rotatably connected to the frame and rotate about an axis while the second set 34 of one or more wheels includes a pair of rear wheels that are rotatably connected to the frame and rotate about an axis. The underbody 26 may generally extend or span a distance between the first and second ends 16, 18 of the vehicle body.

The underbody 26 of the vehicle 10 may be defined by one or more regions extending between the first or front end 16 and second or rear body end 18. A forward underbody portion 36 may be defined as an area of the underbody 26 generally extending between the first or front end 16 of the body 14 and the first set 32 of the one or more wheels. A rearward underbody portion 38 may be defined as an area of the underbody 26 generally extending between the second set 34 of the one or more wheels and the second or rear end 18 of the body 14. A central underbody portion 40 may be defined as an area of the underbody 26 between the forward underbody portion 36 and rearward underbody portion 38. It is understood that the underbody regions described herein may also be in alternative configurations based upon the configuration of the vehicle 10.

The underbody 26 may include a substantially flat surface portion. A first airflow portion 42 may flow past the vehicle body 14 with limited disturbance. The underbody 26 may also define a space 44 between the vehicle body 14 and the road surface 12. Accordingly, the space 44 permits the first airflow portion 42 to pass under the vehicle body 14, between the vehicle body 14 and the road surface 12, while a second airflow portion 46 passes over the top body portion 24. Furthermore, a third airflow portion 48 passes around the left and right sides 20, 22 of the vehicle body 14. As is illustrated in FIG. 1, the first airflow portion 42 travels or passes beneath the underbody 26 of the vehicle through the space 44 between the road surface 12 and the vehicle 10.

Figure 3:
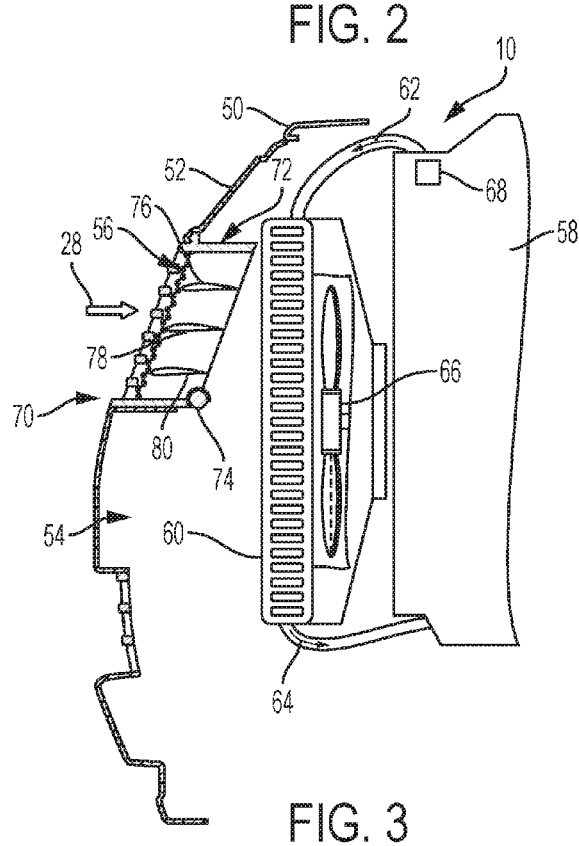
FIG. 3 is a partial side cross-sectional view of the vehicle having a shutter system, with the shutter system depicted in a fully opened state.

FIG. 3 shows a partial side view of a vehicle 10. The vehicle 10 includes a hood 50 at least partially covering a portion 52 of the front end 16 of the vehicle body 14, and thereby, defining an under-hood compartment 54 below. The vehicle 10 is shown to include at least one grille opening 56 receiving ambient air flowing toward the front end 16 of the body 14 of the vehicle 10.

The under-hood compartment 54 of the vehicle 10 may accept a number of alternative distinct powertrains. A specific powertrain may be selected based on the intended use of the vehicle 10 or the general preference of the vehicle's user. Accordingly, during the initial design of the vehicle 10, the under-hood compartment 54 may accommodate each of the alternative powertrains. Hence, although the physical size of the alternative powertrains, as well as the power output of the respective engines, may be vastly different, the overall size and layout of the particular under-hood compartment 54 remains relatively unchanged.

Generally, openings in the front end 16 of the vehicle 10, such as the grille openings 56, as well as various protruding features on the surface of the vehicle body 14, tend to impact the vehicle's aerodynamic signature. Accordingly, it is typically beneficial to minimize the size of such grille openings 56 whenever additional airflow into the under-hood compartment 54 is not required. Although one grille opening 56 is depicted and described, nothing precludes the vehicle 10 from having a greater number of grille openings for admitting the ambient airflow 28 into the under-hood compartment 54 from the ambient atmosphere. It is also contemplated that the grille opening 56 may be provided in the front end 16 of a vehicle, the grille opening 56 may also be provided in a mid-body or rear body portion of the vehicle 10 adjacent a powertrain location.

The vehicle 10 additionally includes a powertrain that is specifically represented by an internal combustion engine 58. The powertrain of the vehicle 10 may additionally include a transmission, and, if the vehicle is a hybrid type, one or more motor-generators, none of which is shown, but the existence of which can be appreciated by those skilled in the art. Efficiency of a vehicle powertrain is generally influenced by its design, as well as by the various loads the powertrain sees during its operation.

The vehicle 10 additionally includes an air-to-fluid heat exchanger 60, also called a radiator, for circulating a cooling fluid shown by arrows 62 and 64, such as water or a specially formulated coolant, through the engine 58 to remove heat from the engine 58. A high-temperature coolant entering the heat exchanger 60 is represented by the arrow 62, and a reduced-temperature coolant being returned to the engine is represented by the arrow 64. Typically, the coolant is continuously circulated by a fluid pump (not shown) between the engine 58 and the heat exchanger 60.

As shown in FIG. 3, the heat exchanger 60 is positioned behind the at least one grille opening 56 that may be covered by a mesh (not shown) for protection of the heat exchanger 60 from various road and air-borne debris. Although the heat exchanger 60 is shown as being positioned at the front of the vehicle 10, adjacent or proximate to the first end 16, the heat exchanger may also be positioned in a different location, such as behind a passenger compartment. Positioning the heat exchanger 60 behind the passenger compartment may be advantageous, if, for example, the vehicle has a rear or a mid-engine configuration.

Although a single heat exchanger 60 is depicted, nothing precludes the number of heat exchangers being arranged side by side or in a series for cooling several vehicle systems or components, such as the transmission. Both the engine 58 and heat exchanger 60 may be mounted in the under-hood compartment 54 where they can be accessed by the airflow. As shown, after being admitted through the grille opening 56, the airflow 28 is passed through the heat exchanger 60.

A fan 66 is positioned in the vehicle 10, behind the heat exchanger 60, such that the heat exchanger 60 is positioned between the grille opening 56 and the fan 66. The fan 66 may be driven either electrically by an electric motor (not shown) or mechanically by the engine 58. The fan 66 is capable of being selectively turned on and off based on the cooling needs of the engine 58. Depending on the road speed of the vehicle 10, the fan 66 is adapted to either generate or enhance a flow of ambient air or airflow 28 through the grille opening 56 toward and through the heat exchanger 60.

Once generated or enhanced through the action of the fan 66, the airflow 28 is passed through the heat exchanger 60 to remove heat from the high-temperature coolant 62 before the reduced-temperature coolant 64 is returned to the engine 58. The vehicle 10 additionally includes a coolant sensor 68 to sense a temperature of the high-temperature coolant 62 as it exits the engine 58.

In one non-limiting embodiment of the disclosure, the vehicle 10 may include a shutter system 70 cooperating with the at least one grille opening 56. The shutter system 70 may include a rotatable or adjustable shutter assembly 72. The shutter assembly 72 is secured in the vehicle 10 and to regulate an amount of the airflow 28 entering or flowing into the vehicle through the grille opening 56. As shown, the shutter assembly 72 is positioned behind, and immediately adjacent to the at least one grille opening 56 at the front end 16 of the vehicle 10 between the grille opening 56 and heat exchanger 60.

The shutter assembly 72 may alternatively be incorporated into and be integral with the grille opening 56. The shutter assembly 72 includes a frame 74 and at least one vane 76 operably connected to the frame 74. As shown in FIG. 3, the at least one vane 76 includes individual vanes 76, 78, 80, but the number of vanes 76, 78, 80 may either be fewer or greater, mounted within the frame 74.

Vanes 76, 78, 80 may be fixed to have a permanently set angle with respect to the frame. Alternatively, vanes 76, 78, 80 may also be operable, to have an angle that is adjustable with respect to the frame for permitting a desired amount of light, air, and/or liquid to pass from one side of the shutter to the other. Although the vanes 76, 78, 80 are shown as rotatable panels, the term vane or vanes may include the combination of louvers, panels or slats moveable in various manners with respect to each other and to their respective frames.

Figure 4:
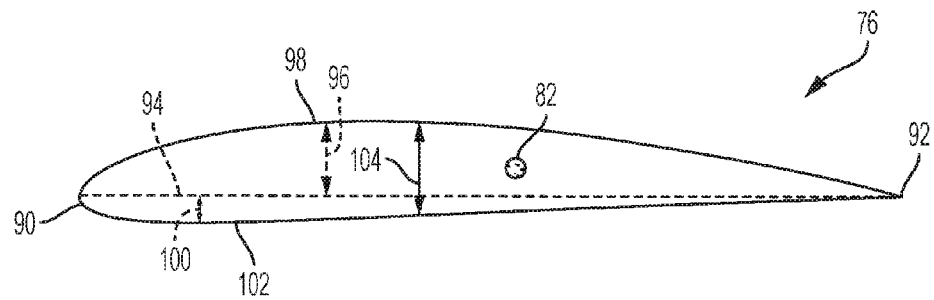
FIG. 4 is a cross-sectional view of a first configuration of the at least one vane of the shutter system in accordance with the present disclosure.

Each vane 76, 78, 80 may rotate about a respective pivot axis 82, as shown in FIG. 4, during operation of the shutter assembly 72. Vanes 76, 78, 80 are selectively positionable between at least an open position and a closed position to selectively open and close the shutter assembly 72, thereby effectively controlling the size of the grille opening 56 and the amount of ambient airflow 28 into the vehicle 10. The shutter assembly 72 is adapted to operate between and inclusive of at least a fully-closed position or state shown in FIG. 6, through an intermediate or partially-closed position and to a fully-opened position as shown in FIG. 3. When the vanes 76, 78 80 are in their open positions, the airflow 28 enters the vehicle 10 by penetrating the plane of shutter assembly 72 before encountering the heat exchanger 60.

Figure 6:
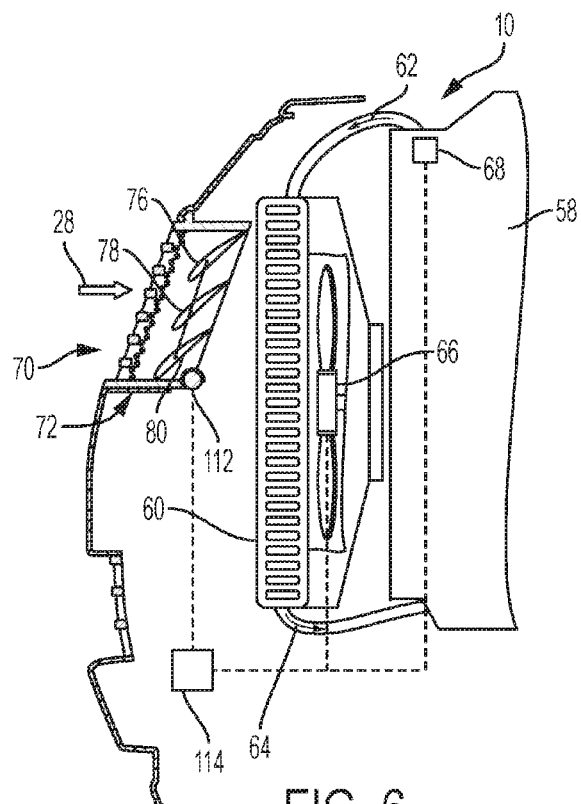
FIG. 6 is a partial side cross-sectional view of the vehicle having a shutter system, with the shutter system depicted in a fully closed state.

When the shutter system 70 is fully-closed as shown in FIG. 6, the vanes 76, 78, 80 provide blockage of the airflow at the grille opening 56. A fully-closed shutter system 70 provides optimized aerodynamics for the vehicle 10 when engine cooling through the grille opening 56 is not required. When the shutter system 70 is fully-opened as shown in FIG. 3, each vane 76, 78, 80 is rotated to a position parallel to the airflow seeking to penetrate the shutter system plane through the grille opening 56. Thus, a fully-opened shutter system 70 permits a generally unfettered passage of such a stream of air through the plane of the shutter system 70.

In a moving vehicle 10, the airflow 28 at ambient temperature and traveling at a certain velocity with respect to the vehicle 10, penetrates the vehicle's grille opening 56. The airflow 28 that moves relative to the vehicle 10 traveling above the threshold vehicle speed generates a significant positive air pressure at grille opening 56. In the vehicle 10 traveling at or below the threshold speed, including when the vehicle is stationary, the airflow 28 at ambient temperature and traveling at a certain low velocity with respect to the vehicle 10 penetrates the vehicle's grille opening 56. The airflow 28 that moves relative to the vehicle 10 traveling below the threshold speed generates a minimal positive pressure at grille opening 56. Therefore, unless the load on the powertrain of the vehicle 10 requires otherwise, the shutter system 70 may be maintained in the fully-opened position.

Above the threshold vehicle speed, the airflow 28 at ambient temperature and traveling at a certain velocity with respect to the vehicle 10 generates some positive pressure at the grill opening 56, at vehicle speeds above the threshold speed coupled with increased vehicle loads, the velocity of airflow 28 may be insufficient to cool the engine 58. Such may be the case even when the shutter system 70 is fully-opened and the grille opening 56 is unrestricted, because vehicle loads increase significantly at higher vehicle speeds, especially during warmer, summer temperatures. Accordingly, in the vehicle 10 traveling above the threshold speed, when the fan 66 is operating at or above the second predetermined speed, a fully-opened position may be selected for the shutter system 70 to aid powertrain cooling.

Figure 5:
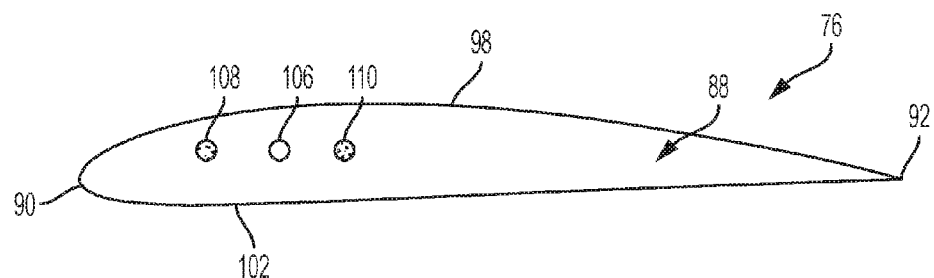
FIG. 5 is a cross-sectional view of a second configuration of the at least one vane of the shutter system.

Referring now to FIGS. 4 and 5, the at least one vane 76 for use in the shutter system 70 is described in greater detail. It is contemplated that each of the at least one vanes 76, 78, 80 shown in FIGS. 3 and 6 may be uniform in size and shape. However, it is understood that vanes 76, 78, 80 may each be of a distinct size and shape and accomplish the purposes of this disclosure.

Referring now to FIGS. 4 and 5, the at least one vane 76 includes a body 88 including a forward or leading edge 90 and an opposing rear or trailing edge 92. In one embodiment of the disclosure, the body 88 of the vane 76 may be configured or shaped as a cambered airfoil as shown in the cross-sectional view of FIG. 4 to increase the lift coefficient of the vane 76. It is understood that the body 88 may be constructed in a different shape or airfoil configuration than that shown in the Figures and described herein. It is also understood that cambered, for purposes of the disclosure, may be defined as the thickness of the airfoil in cross-section as shown in the Figures. Alternatively, camber may include an asymmetry between two acting surfaces of an airfoil or the asymmetry between the top and the bottom surfaces of the airfoil body 88.

The cambered airfoil configuration of the at least one vane 76 may be defined by a chord line 94 extending generally between the leading edge 90 and the trailing edge 92 of the body 88. The leading edge 90 of the body 88 may be defined as an area that yields the maximum length of the chord line 94 or the maximum curvature of the body 88 of the vane 76 while the trailing edge 92 is the area that yields a minimum curvature of the body 88 of the vane 76.

As shown in FIG. 4, the cambered airfoil configuration of the body 88 at least one vane 76 includes an upper camber 96 and a lower camber 100. The upper camber 96 may be defined by the distance between the chord line 94 and the upper surface 98 of the body 88 of the vane 76. The lower camber 100 may be defined by the distance between the chord line 94 and the lower surface 102 of the body 88 of the vane 76. As shown in FIG. 4, the camber of the body 88 of the vane 76 is a positive camber, as the upper surface 98 of the body 88 is more convex than the lower surface 102 of the body 88, such that the curvature of the upper camber 96 is greater than the curvature of the lower camber 100. The thickness of the body 88 may be defined as the sum of the distance of upper camber 96 and lower camber 100.

The cambered airfoil shape of the body 88 of the at least one vane 76 may be moved through the air traveling through the at least one grille opening 56 of the body 14 of the vehicle 10 (not shown in FIG. 4) to produce an aerodynamic force in response to airflow 28 entering through the at least one grille opening 56 that interacts with the leading edge 90 of the body 88 of the at least one vane 76. For example, lift may be generated by the vane 76 based upon the angle of attack of the airflow 28 relative to the leading edge 90 of the vane 76 and shape of the body 88 as a perpendicular force to the direction of motion of the vane 76 and the vehicle.

The pivot or rotation point 106 of the body 88 about the pivot axis 82 of the vane 76 takes advantage of aerodynamic moments. The leading edge 90 of the body 88 of the vane 76 deflects the oncoming airflow 28 resulting in a force on the body 88 in the direction opposite to the deflection. It is understood that cambered airfoils generate lift at zero angle of attack. Drag may be generated by the vane 76 as a parallel force to the direction of motion of the vane 76 and the vehicle 10. For example, when the vehicle 10 reaches highway speeds, the lift force causes the vanes 76, 78, 80 to rotate about the rotation point 106 to a closed position as shown in FIG. 6, which lowers the aerodynamic forces and increases fuel economy. Utilization of a cambered airfoil design for the body 88 of the at least one vane 76 may eliminate the use of an adjustment mechanism such as a motor (not shown) or may reduce the requirement of incorporating an adjustment mechanism. The disclosed body configuration of the at least one vane 76 may reduce drag by about −0.007 CD to about −0.014 CD.

In another embodiment of the disclosure, in order to address temperatures that may generate icing conditions or where the vanes 76, 78, 80 may need to be opened to combat positive temperature coefficient (PTC) temperatures, each of the at least one vanes 76 may include a member to provide a secondary positioning feature for the vane 76. Ambient temperatures near and below freezing may present additional considerations for cooling of the powertrain in the vehicle. When the ambient temperature is below a predetermined value, such as near or below 0 degrees Celsius, sufficient cooling of the engine 58 may be achieved with the grille opening 56 either in a partially restricted or fully blocked or closed state. At the same time, the vanes 76, 78, 80 may freeze and not freely adjust at low temperatures. Therefore, in order to prevent jamming of the shutter system 70 in an unwanted position, when the ambient temperature is below a predetermined value, the member may move vanes 76, 78, 80 to an appropriate predetermined position of the shutter system 70. This may be selected and locked without regard to vehicle speed and load. The grille opening 56 may be placed in various positions between and inclusive of the fully-opened and the fully-restricted states via the predetermined position of the shutter system 70 depending on the cooling requirements of the powertrain of the vehicle.

The member may include, but not be limited to, a loadable torsion spring, a linear actuator cooperating with a lever or spring to bias the actuator, a shape memory alloy (SMA) actuator, or an electric motor. An icing condition may occur when temperatures are below about 4 degrees Celsius. Alternatively, if the vanes are iced, a boost condition may be generated by utilizing the member to generate a torque to try and force vanes open of about 3 Nm.

Alternatively, as shown in FIG. 6, the shutter system 70 may also include a mechanism 112 operatively connected to the shutter assembly 72 to adjust the shutter assembly 72, and thereby selectively position the shutter assembly 72 between and inclusive of fully-opened and fully-closed. The mechanism 112 may cause the vanes 76, 78, 80 to rotate in tandem or substantially in unison, and permitting the shutter assembly 72 to rotate into various available positions. The mechanism 112 may be adapted to select and lock either discrete intermediate positions of the vanes 76, 78, 80 or to infinitely vary position of the louvers between and inclusive of the fully-opened and fully-closed. The mechanism 112 acts to select the desired position for the shutter assembly 72 when activated by external means, as understood by those skilled in the art, such as an electric motor or the like.

The vehicle 10 also includes a controller 114, which may be an engine controller or a separate control unit, operatively connected to the mechanism 112 to regulate movement of the mechanism 112 to selectively position the at least one vane 76 of the shutter assembly 72 according to a load on the internal combustion engine 58. The controller 114 may also operate the fan 66, if the fan is electrically driven, and a thermostat (not shown) to regulate the circulation of coolant.

The controller 114 may be programmed to operate the mechanism 112 according to a load on the engine 58 and, correspondingly, to the temperature of the coolant sensed by the sensor 68. The temperature of the high-temperature coolant 62 is increased due to the heat produced by the engine 58 under load with a reduced-temperature coolant being returned to the engine is represented by the arrow 64.

The sensor 68 may be adapted to sense a temperature of the fluid or coolant 62 and communicate the temperature to the controller 114. A load on the engine 58 is typically dependent on operating conditions imposed on the vehicle 10, such as going up a hill and/or pulling a trailer. The load on the engine 58 generally drives up the internal temperature of the engine 58, which in turn necessitates cooling of the engine 58 for desired performance and reliability. Typically, the coolant is continuously circulated by a fluid pump (not shown) between the engine 58 and the heat exchanger 60.

Referring now to FIG. 5, an alternative configuration for the at least one vane 76 of the shutter system is disclosed. The at least one vane 76 may include a pivot point or rotation point 106 that is movable relative to the body 88 of the vane 76. By adjusting the position of the pivot point 106 of the at least one vane 76, the vane 76 may be positioned in at least one of an open or closed configuration. As shown in FIG. 5, the pivot point 106 may be moved to at least a first adjusted pivot or rotation point 108 to configure the vane 76 to move to an open position or configuration. Further, the pivot point 106 may be moved to a second adjusted pivot or rotation point 110 to configure the vanes in a closed position or configuration.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A shutter system cooperating with at least one grille opening in a body of a vehicle, the shutter system comprising:
a shutter assembly regulating an airflow entering through the at least one grille opening, the shutter assembly including
a frame, and
at least one vane operably connected to the frame and selectively positionable between at least an open position and a closed position, the at least one vane having a body shaped as a cambered airfoil defining a leading edge and an opposing trailing edge,
wherein the at least one vane is pivotally connected at a pivot point and is adjustable relative to the frame between at least the open position and the closed position in response to the airflow entering through the at least one grille opening interacting with the leading edge of the cambered airfoil.

2. The shutter system of claim 1 wherein the leading edge of the cambered airfoil body of the at least one vane is defined as an area that yields a maximum curvature of the body and the trailing edge is defined as an area that yields a minimum curvature of the body.

3. The shutter system of claim 2 wherein the cambered airfoil of the at least one vane further comprises an upper camber and a lower camber.

4. The shutter system of claim 3 wherein the cambered airfoil is a positive camber as defined by a curvature of the upper camber being greater than a curvature of the lower camber.

5. The shutter system of claim 1 wherein the pivot point of the at least one vane is adjustable between at least a first adjusted pivot point to configure the at least one vane to move to the open position and a second adjusted pivot point to configure the at least one vane to move to the closed position.

6. The shutter system of claim 1, further comprising:
a mechanism operatively connected to the at least one vane and to actuate the at least one vane; and
a controller regulating the mechanism, wherein the controller regulates the mechanism to control the airflow through the at least one grille opening.

7. The shutter system of claim 6, wherein the vehicle includes an internal combustion engine, and the controller regulates the mechanism according to a load on the internal combustion engine.

8. The shutter system of claim 7, wherein the engine is cooled by a fluid circulated through a heat exchanger, and the vehicle includes a sensor adapted to sense a temperature of the fluid and to communicate the temperature to the controller.

9. The shutter system of claim 8, wherein the controller regulates the mechanism to cool the fluid circulated through the heat exchanger according to a sensed temperature of the fluid.

10. A vehicle having a body comprising:
at least one grille opening formed in the body of the vehicle;
an internal combustion engine and a heat exchanger in fluid communication with the engine disposed proximate the at least one grille opening, wherein the engine is cooled by a liquid circulated through the heat exchanger; and
a shutter system cooperating with at least one grille opening, the shutter system including a shutter assembly configured to regulate an airflow entering through the at least one grille opening, the shutter assembly including
a frame, and at least one vane operably connected to the frame and selectively positionable between at least an open position and a closed position, the at least one vane having a body shaped as a cambered airfoil defining a leading edge and an opposing trailing edge, wherein the at least one vane is pivotally connected at a pivot point and is adjustable relative to the frame between at least the open position and the closed position in response to the airflow entering through the at least one grille opening interacting with the leading edge of the body of the at least one vane.

11. The vehicle of claim 10 wherein the leading edge of the cambered airfoil body of the at least one vane is defined as an area that yields a maximum curvature of the body and the trailing edge is defined as an area that yields a minimum curvature of the body.

12. The vehicle of claim 11 wherein the cambered airfoil body of the at least one vane further comprises an upper camber and a lower camber.

13. The vehicle of claim 10 wherein the pivot point of the at least one vane is adjustable between at least a first adjusted pivot point to configure the at least one vane to move to the open position and a second adjusted pivot point to configure the at least one vane to move to the closed position.

14. The vehicle of claim 10, further comprising:
a mechanism operatively connected to the at least one vane and to actuate the at least one vane; and
a controller regulating the mechanism, wherein the controller regulates the mechanism to control the airflow through the at least one grille opening,
wherein the controller regulates the mechanism according to a load on the internal combustion engine.

15. The vehicle of claim 14 further comprising a sensor adapted to sense a temperature of the fluid and to communicate the temperature to the controller, wherein the controller regulates the mechanism to cool the fluid circulated through the heat exchanger according to the sensed temperature of the fluid.

16. A vehicle comprising:
a vehicle body having a first end facing oncoming airflow when the vehicle is in motion relative to a road surface and an opposing second end;
an under-hood compartment provided in the first end of the vehicle body;
an internal combustion engine received in the under-hood compartment and a heat exchanger in fluid communication with the engine, wherein the engine is cooled by a liquid circulated through the heat exchanger;
at least one grille opening provided in the first end of the vehicle body and cooperating with the under-hood compartment to receive the airflow; and
a shutter system cooperating with the at least one grille opening, the shutter system including a shutter assembly configured to regulate an airflow entering through the at least one grille opening, the shutter assembly including
a frame, and
at least one vane operably connected to the frame and selectively positionable between at least an open position and a closed position, the at least one vane having a body shaped as a cambered airfoil defining a leading edge and an opposing trailing edge,
wherein the at least one vane is pivotally connected is pivotally connected at a pivot point and is adjustable relative to the frame between at least the open position and the closed position in response to the airflow entering through the at least one grille opening interacting with the leading edge of the body of the at least one vane.

17. The vehicle of claim 16 wherein the leading edge of the cambered airfoil body of the at least one vane is defined as an area that yields a maximum curvature of the body and the trailing edge is defined as an area that yields a minimum curvature of the body.

18. The vehicle of claim 17 wherein the cambered airfoil body of the at least one vane further comprises an upper camber and a lower camber.

19. The vehicle of claim 16 wherein the pivot point of the at least one vane is adjustable between at least a first adjusted pivot point to configure the at least one vane to move to the open position and a second adjusted pivot point to configure the at least one vane to move to the closed position.

20. The vehicle of claim 16, further comprising:
a mechanism operatively connected to the at least one vane and to actuate the at least one vane; and
a controller regulating the mechanism, wherein the controller regulates the mechanism to control the airflow through the at least one grille opening,
wherein the controller regulates the mechanism according to a load on the internal combustion engine.

* * * * *